United States Patent [19]

Cooper et al.

[11] Patent Number: 5,521,258

[45] Date of Patent: May 28, 1996

[54] AUTOCLAVE RESISTANT BLENDS OF POLY(ESTER-CARBONATE) AND POLYETHERIMIDE RESINS

[75] Inventors: Stephen M. Cooper, Newburgh; Ronald A. Greenberg; Darryl Nazareth, both of Evansville, all of Ind.

[73] Assignee: General Electric Company, Pittsfield, Mass.

[21] Appl. No.: 339,421

[22] Filed: Nov. 14, 1994

[51] Int. Cl.$^6$ .......................... C08L 69/00; C08L 67/03; C08L 77/00; C08L 81/06

[52] U.S. Cl. .......................... 525/425; 525/433; 525/439; 525/462

[58] Field of Search ........................ 525/425, 433

[56] References Cited

U.S. PATENT DOCUMENTS

| | | |
|---|---|---|
| 2,999,835 | 9/1961 | Goldberg . |
| 3,027,814 | 4/1962 | Schnellmann et al. . |
| 3,028,365 | 4/1962 | Schnell et al. . |
| 3,153,008 | 10/1964 | Fox . |
| 3,169,121 | 2/1965 | Goldberg . |
| 3,264,536 | 8/1966 | Robinson et al. . |
| 3,275,601 | 9/1966 | Schnell et al. . |
| 3,303,331 | 2/1967 | Biegel et al. . |
| 3,334,154 | 8/1967 | Kim . |
| 3,544,514 | 12/1970 | Schnell et al. . |
| 3,635,895 | 1/1972 | Kramer . | |
| 3,803,085 | 4/1974 | Takahoshi . | |
| 3,814,869 | 6/1974 | DeLuca .................. 179/175 |
| 3,847,867 | 11/1974 | Heath . | |
| 3,850,885 | 11/1974 | Takahoshi et al. . | |
| 3,852,242 | 12/1974 | White . | |
| 3,855,178 | 12/1974 | White et al. . | |
| 3,905,942 | 9/1975 | Takakoshi et al. . | |
| 3,915,926 | 10/1975 | Wambach . | |
| 3,972,902 | 8/1976 | Heath et al. . | |
| 3,983,093 | 9/1976 | Williams, III et al. ............ 428/443 |
| 4,001,184 | 1/1977 | Scott . | |
| 4,108,837 | 8/1978 | Johnson et al. ............ 528/126 |
| 4,175,175 | 11/1979 | Johnson et al. ............ 528/125 |
| 4,188,314 | 2/1980 | Fox et al. ............ 525/433 |
| 4,324,869 | 4/1982 | Robeson ............ 525/68 |
| 4,400,499 | 8/1983 | Colon ............ 528/174 |
| 4,430,484 | 2/1984 | Quinn ............ 525/425 |
| 4,487,896 | 12/1984 | Mark et al. ............ 525/439 |
| 4,532,305 | 7/1985 | Dickinson ............ 525/390 |
| 5,387,639 | 2/1995 | Sybert ............ 525/433 |

FOREIGN PATENT DOCUMENTS 186927  7/1986  European Pat. Off. ............ 525/433

*Primary Examiner*—David Buttner

[57] ABSTRACT

Compositions which comprise blends of a poly(ester-carbonate) resin and a polyetherimide or a poly(ether sulfone) resin are provided. The compositions are useful for preparing articles that are resistant to autoclave sterilization conditions.

8 Claims, No Drawings

AUTOCLAVE RESISTANT BLENDS OF POLY(ESTER-CARBONATE) AND POLYETHERIMIDE RESINS

BACKGROUND OF THE INVENTION

1. Field of the Invention

The invention relates to thermoplastic molding compositions and more particularly to autoclave resistant molding compositions which are blends of poly(ester-carbonate) and polyetherimide or poly(ether sulfone) resins.

2. Brief Description of the Related Art

Poly(ester-carbonate) (PEC) resins have been useful as ingredients in the preparation of blends of thermoplastic molding resins. These blends can be attractive to mold particular articles having certain desirable physical properties. For example, U.S. Pat. No. 4,430,484 (Quinn) issued Feb. 7, 1984, describes blends of poly(ester-carbonate) resins with aromatic polyamides, polyimides, polyamideimides and polyetherimides showing improved properties, such as higher heat distortion temperature under load. However, articles molded from some of these blends can exhibit some brittleness and blistering when subjected to autoclave conditions typical for sterilization of medical equipment.

In copending and commonly owned U.S. patent application Ser. No. 716,940, filed Jun. 18, 1991, now abandoned, ternary blends of polyetherimides, siloxane polyetherimide copolymers and polycarbonate resins including poly(ester-carbonate) resins are described broadly as thermoplastically moldable to obtain ductile articles with improved flame retardancy and strength properties useful in engineering thermoplastics.

In copending and commonly owned U.S. patent application Ser. No. 965,484, filed Oct. 23, 1992, blends of polyetherimides and siloxane polyetherimide copolymers and polycarbonate resins including poly(ester-carbonate) resins are described broadly as a method for improving the stress crack resistance of articles.

In copending and commonly owned U.S. patent application Ser. No. 965,646, filed Oct. 23, 1992, now U.S. Pat. No. 5,387,639 ternary blends of polyetherimides, thermoplastic aromatic polyarylate resins and polycarbonate resins including poly(ester-carbonate) resins are described broadly as thermoplastically moldable to obtain ductile articles.

Many of these same blends would be useful for the manufacture of articles, such as surgical trays, for the medical industry except for the stringent and harsh sterilization conditions required for this industry. Useful articles made from these compositions for the medical industry would have to be able to withstand autoclave sterilization at temperatures of at least 270° F. for as many as 500 cycles without deforming or blistering while maintaining their physical properties. Additionally, these compositions would have to be sufficiently ductile to avoid cracking and breakage from routine handling, including dropping. Although poly(ester-carbonate) resins have the impact strength needed for these applications, they are unable to withstand the autoclave sterilization procedure. Conversely, polyetherimide resins can withstand the autoclave sterilization procedure but are too brittle to meet the toughness requirement. Thus, there is a long felt need for the development of ductile compositions that are able to withstand repeated autoclave sterilization conditions without distorting or blistering.

SUMMARY OF THE INVENTION

The present invention provides thermoplastic molding compositions which meet the long felt needs for ductile, autoclave resistant articles, which comprise blends of:

(a) a poly(ester-carbonate) resin; and
(b) an effective amount of a resin to provide autoclave resistance, the resin comprising a polyetherimide comprising repeat units of the formula (I):

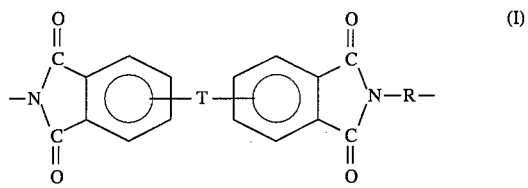

wherein T is —O— or a group of the formula —O—Z—O— wherein the divalent bonds of the —O— or the —O—Z—O— group are in the 3,3',3,4',4,3', or the 4,4' positions; Z is a divalent radical selected from the group consisting of formulae (II):

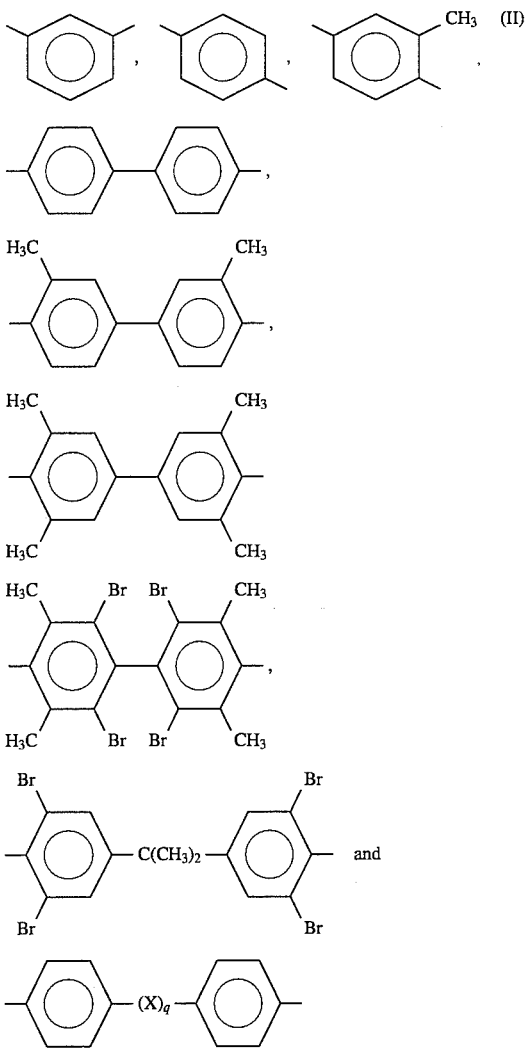

wherein X is a member selected from the group consisting of divalent radicals of the formulae (III):

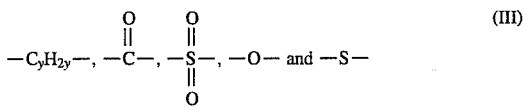

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the formula (IV):

$$-\phenyl-Q-\phenyl- \quad (IV)$$

where Q is a member selected from the group consisting of formulae (V):

$$-C_yH_{2y}-, \ -\overset{O}{\underset{\|}{C}}-, \ -\overset{O}{\underset{\|}{\underset{O}{S}}}-, \ -O- \text{ and } -S- \quad (V)$$

where y is an integer from about 1 to about 5.

The present invention also provides thermoplastic molding compositions which meet the long felt needs for ductile, autoclave resistant articles, which comprise blends of:

(a) a poly(ester-carbonate) resin; and (c) an effective amount of a resin to provide autoclave resistance, the resin comprising a poly(ether sulfone) resin comprising repeat units of formula (VI):

$$+\phenyl-\overset{O}{\underset{\underset{O}{\|}}{S}}-\phenyl-O-\phenyl-\phenyl+ \quad (VI)$$

A preferred embodiment of the present invention relates to providing thermoplastic molding compositions which meet the long felt needs for ductile, autoclave resistant articles, which comprise blends of:

(a) a poly(ester-carbonate) resin containing repeating polycarbonate chain units of the formula (VII):

$$+O-D-O-\overset{O}{\underset{\|}{C}}+ \quad (VIII)$$

wherein D is a divalent aromatic radical of a dihydric phenol employed in the resin preparation; and recurring carboxylic chain uniks of the formula (VIII):

$$-O-R-O-D- \quad (VIII)$$

wherein D has the meaning previously ascribed to it and R is a divalent moiety selected from those of the formulae (XIX) or (X), or mixtures thereof:

$$-\overset{O}{\underset{\|}{C}}-\metaphenyl-\overset{O}{\underset{\|}{C}}- \quad (XIX)$$

or $$-\overset{O}{\underset{\|}{C}}-\paraphenyl-\overset{O}{\underset{\|}{C}}-; \quad (X)$$

and (b) an effective amount of a resin to provide autoclave resistance, wherein the resin is a polyetherimide resin having repeating chain units of the formula (XI):

$$+N\overset{\overset{O}{\|}}{\underset{\underset{O}{\|}}{\phantom{N}}}\phenyl-O-R^1-O-\phenyl\overset{\overset{O}{\|}}{\underset{\underset{O}{\|}}{\phantom{N}}}N-R^2+_f \quad (XI)$$

wherein f is an integer of from about 10 to about 500; $R^2$ is para-phenylene and $R^1$ is the divalent moiety of formula (XII):

$$-\phenyl-\overset{\overset{CH_3}{|}}{\underset{\underset{CH_3}{|}}{C}}-\phenyl-. \quad (XII)$$

DETAILED DESCRIPTION OF THE PREFERRED EMBODIMENTS OF THE INVENTION

The poly(ester-carbonate) resins (referred to hereinafter as "PEC") used as ingredient (a) in the blends of the present invention. may be prepared by either melt polymerization or by interfacial polymerization.

Melt polymerization involves coreacting, for example, diphenyl carbonate with various mixtures of dihydric phenols and ester precursors such as, for example, diphenyl derivatives of iso- and terephthalates, and their mixtures. Various catalysts or mixtures of catalysts such as, for example, lithium hydroxide and lithium stearate can also be used to accelerate the polymerization reactions.

In general, the method of interfacial polymerization comprises the reaction of a dihydric phenol with a carbonate precursor in the presence of an ester precursor. Examples of interfacial polymerization techniques can be found in U.S. Pat. Nos. 3,169,121 and 4,487,896 which are incorporated herein by reference.

Although the reaction conditions of the preparative processes may vary, several of the preferred processes typically involve dissolving or dispersing dihydric phenol reactants in aqueous caustic, combining the resulting mixture with a suitable water immiscible solvent medium and contacting the reactants with the carbonate precursor, such as, for example, phosgene, in the presence of a suitable catalyst and under controlled pH conditions. The most commonly used water immiscible solvents include methylene chloride, 1,2-dichloroethane, chlorobenzene, toluene, and the like.

Advantageously a catalyst may be added to the reaction mixture to promote the reaction. The catalyst typically accelerates the rate of polymerization of the dihydric phenol reactants with the carbonate precursors. Representative catalysts include but are not limited to, for example, tertiary amines such as triethylamine, quaternary phosphonium compounds, quaternary ammonium compounds, and the like.

The preferred process for preparing PEC comprises a phosgenation reaction. The temperature at which the phosgenation reaction proceeds may vary from below about 0° C. to about 100° C. The phosgenation reaction preferably proceeds at temperatures of from about room temperatures (about 23° C.) to about 50° C. Since the reaction is exothermic, the rate of phosgene addition may be used to control the reaction temperature. The amount of phosgene required will generally depend upon the amount of the dihydric phenol reactants added.

The dihydric phenols employed are known, and the reactive groups are thought to be the phenolic hydroxyl groups. Some of the dihydric phenols are represented by the general formula (XIII):

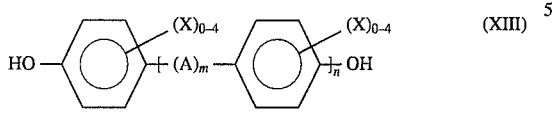

wherein A is a divalent hydrocarbon radical containing from 1 to about 15 carbon atoms or a substituted divalent hydrocarbon radical containing from 1 to about 15 carbon atoms and substituent groups such as halogen; —S—;—SS—; —S(O)—; —S(O)$_2$—; —O—; or —S(O)—; each X is independently selected form the group consisting of hydrogen, halogen, and a monovalent hydrocarbon radical such as an alkyl group of from 1 to about 8 carbon atoms, an aryl group of from 6 to about 18 carbon atoms, an aralkyl group of from 7 to about 14 carbon atoms, and alkaryl group of from 7 to about 14 carbon atoms, and alkoxy group of from 1 to about 8 carbon atoms; and m is 0 or 1 and n is an integer of from 0 to about 5.

Typical of some of the dihydric phenols employed are bis-phenols such as (4-hydroxy-phenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl)ether, bis(3,5-dichloro-4-hydroxyphenyl)ether; dihydroxydiphenyl such as p,p'-dihydroxydiphenyl, 3,3'-dichloro-4,4'-dihydroxydiphenyl; dihydroxyaryl sulfone such as bis(4-hydroxyphenyl)sulfone, bis(3,5-dimethyl-4-hydroxyphenyl)sulfone, dihydroxy benzenes such as resorcinol, hydroquinone, halo- and alkyl-substituted dihydroxybenzenes such as 1,4-dihydroxy-2, 5dichlorobenzene, 1,4-dihydroxy-3-methylbenzene; and dihydroxydiphenyl sulfides and sulfoxides such as bis(4-hydroxyphenyl)sulfide, bis(4-hydroxy-phenyl)sulfoxide and bis(3,5-dibromo-4-hydroxy-phenyl)sulfoxide. A variety of additional dihydric phenols are available and are disclosed in U.S. Pat. Nos. 2,999,835, 3,028,365 and 3,153,008; all of which are incorporated herein by reference. It is, of course, possible to employ two or more different dihydric phenols or a combination of a dihydric phenol with a glycol.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxy-3,5-dichlorophenyl)-propane, hydroquinone, and the like, or bishaloformates of glycol, and the like. While all of the above carbonate precursors are useful, carbonyl chloride, also known as phosgene, is preferred.

In general, any dicarboxylic acid conventionally used in the preparation of polyesters may be utilized in the preparation of poly(estercarbonate) resins. However, the PEC used in the present invention are prepared with aromatic dicarboxylic acids, and in particular terephthalic acid, and mixtures thereof with isophthalic acid wherein the weight ratio of terephthalic acid to isophthalic acid is in the range of from about 5:95 to about 95:5, especially preferred are weight ratios of terephthalic acid to isophthalic acid is in the range of from about 40:60 to about 60:40.

Rather that utilizing the dicarboxylic acid per se, it is possible, and sometimes even preferred, to employ various derivatives of the acid moiety. Illustrative of these reactive derivatives are the acid halides. The preferred acid halides are the acid dichlorides and the acid dibromides. Thus, for example instead of using terephthalic acid or mixtures thereof with isophthalic acid, it is possible to employ terephthaloyl dichloride, and mixtures thereof with isophthaloyl dichloride In the conventional interfacial polymerization methods of preparing PEC, polycarbonates and polyarylates, a molecular weight regulator (a chain stopper) is generally added to the reaction mixture prior to or during the polymerization reactions with carbonate and/or ester precursors. Useful molecular weight regulators include, for example, monohydric phenols such as phenol, chroman-I, para-t-butylphenol, p-cumylphenol and the like.

The proportions of reactants employed to prepare the PEC will vary in accordance with the proposed use of the blends of the invention containing this product resin. In general, the amount of the combined ester units of formulas (XI) and (X) may be from about 20% by weight to about 85% by weight, relative to the carbonate units, preferably about 40% to about 80% by weight relative to the carbonate units.

The preferred PEG for use as the ingredient (a) in the blends of the present invention are those derived from reaction of bisphenol-A and phosgene with iso- and terephthaloyl chloride and having an intrinsic viscosity of about 0.5 to about 0.65 deciliters per gram (measured in methylene chloride at a temperature of 25° C.).

Additional embodiments of the invention include thermoplastic molding compositions containing polycarbonate homopolymers.

Polycarbonate homopolymer resins and their method of preparation by interfacial polymerization are provided in U.S. Pat. Nos. 3,028,365, 3,334,154, 3,275,601, 3,915,926, 3,303,331, 3,169,121, 3,027,814 and 4,188,314, all of which are incorporated herein by reference. In general, the method is as described above for preparing PEC, but in the absence of an ester precursor.

Also included within the blends of the present invention is the presence of randomly branched polycarbonates, randomly branched PEC, randomly branched poly(aryl ether)s and/or randomly branched polyarylates. These randomly branched materials are sometimes useful for altering the rheological characteristics of the blends containing the linear polymers for fabrication techniques such as pressure forming or blow molding and can be used as partial or full replacements for the linear materials. The randomly branched polymers are prepared by coreacting a polyfunctional organic compound with the afore-described dihydric phenols, carbonate and/or ester precursors. The polyfunctional organic compounds useful in making the branched polycarbonates are set forth in U.S. Pat. Nos. 3,544,514, 3,635,895 and 4,001,184 which are incorporated herein by reference. The polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl)ethane, 1,3,5,-trihydroxybenzene, trimellitic anhydride, trimellitic acid, trimellityl trichloride, 4-chloroformyl phthalic anhydrjde, pyromellitic acid, pyromellitic dianhydride, mellitic acid, mellitic anhydride, trimesic acid, benzophenonetetracarboxylic acid, benzophenone-tetracarboxylic dianhydride, and the like. The preferred polyfunctional aromatic compounds are 1,1,1-tri(4-hydroxyphenyl)ethane, trimellitic anhydride or trimellitic acid or their haoformyl derivatives.

The polyetherimide resins (referred to hereinafter as PED comprising ingredient (b) in the blends of the present invention are also known compounds whose preparation and properties are described in U.S. Pat. Nos. 3,803,085 and 3,905,942, both of which are incorporated herein by reference.

The PEI used for preparing the blends of this invention contain repeat units in excess of 1 and typically from 10 to 1000 or more of the formula (I):

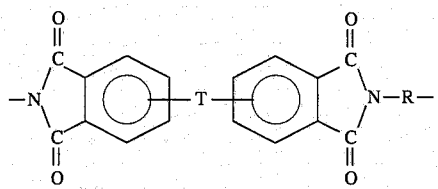
(I)

wherein T is —O— or a group of the formula —O—Z—O— wherein the divalent bonds of the —O— or the —O—Z—O— group are in the 3,3', 3, 4', 4, 3', or the positions; Z is a divalent radical selected from the group consisting of formulae (II):

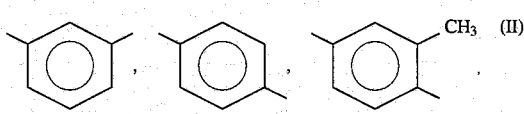
(II)

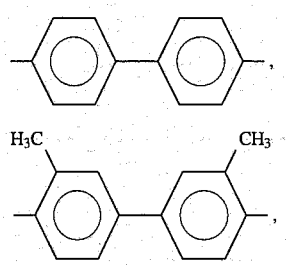

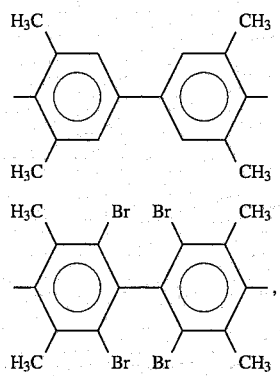

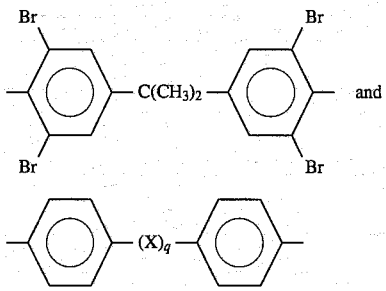

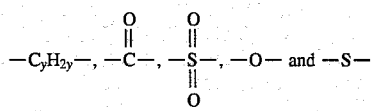

wherein X is a member selected from the group consisting of divalent radicals of the formulae (III):

$$-C_yH_{2y}-, -\overset{O}{\underset{\|}{C}}-, -\overset{O}{\underset{\|}{\underset{O}{S}}}-, -O- \text{ and } -S-$$
(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

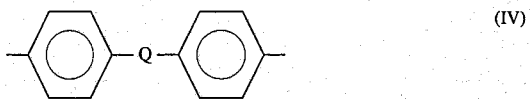
(IV)

where Q is a member selected from the group consisting of formulae (V):

$$-C_yH_{2y}-, -\overset{O}{\underset{\|}{C}}-, -\overset{O}{\underset{\|}{\underset{O}{S}}}-, -O- \text{ and } -S-$$
(V)

where y is an integer from about 1 to about 5.

In one embodiment, the PET may be a copolymer which, in addition to the etherimide units described above, further contains polyimide repeating units of the formula (XIV):

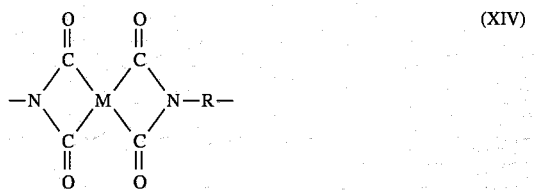
(XIV)

wherein R is as previously defined and M is selected from the group consisting of formula (XV):

(XV)

formula (XVI):

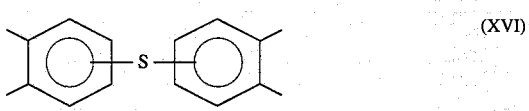
(XVI)

and formula (XVII):

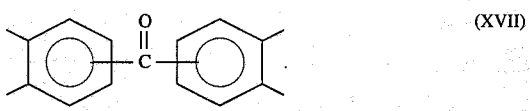
(XVII)

The PEI can be prepared by any of the methods well known to those skilled in the art, including the reaction of an aromatic bis(ether anhydride) of the formula (XVIII):

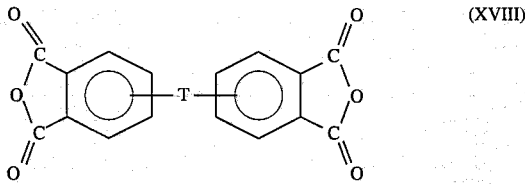
(XVIII)

with an organic diamine of the formula (XIX):

H₂N—R—NH₂ (XIX)

wherein T and R are defined as described above. In general the reactions can be carried out employing well-known solvents, e.g., O-dichlorobenzene, m-cresol/toluene and the like to effect interaction between the anhydride of formula (XVIII) and the diamine of formula (XIX), at temperatures from about 100° C. to about 250° C. Alternatively, the PEI can be prepared by melt polymerization of aromatic bis(ether anhydride)s and diamines accomplished by heating a mixture of the ingredients at elevated temperatures with concurrent stirring. Generally melt polymerizations employ temperatures between about 200° C. and 400° C. Chain stoppers and branching agents may also be employed in the reaction. The PEI and their preparation are described in U.S. Pat. No. 3,983,093 (Williams et al), which is incorporated herein by reference. Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (XVIII) include:

2,2-bis(4-(3,4-dicarboxyphenoxy)phenyl)propane dianhydride;

4,4'-bis(3,4-dicarboxyphenoxy)diphenyl ether dianhydride;

4,4'-bis(3,4-dicarboxyphenoxy)diphenyl sulfide dianhydride;

4,4'-bis(3,4-dicarboxyphenoxy)benzophenone dianhydride;

4,4'-bis(3,4-dicarboxyphenoxy)diphenyl sulfone dianhydride;

2,2-bis([4-(2,3-dicarboxyphenoxy)phenyl]propane dianhydride;

4,4'-bis(2,3-dicarboxyphenoxy)diphenyl ether dianhydride;

4,4'-bis(2,3-dicarboxyphenoxy)diphenyl sulfide dianhydride;

4,4'-bis(2,3-dicarboxyphenoxy)benzophenone dianhydride;

4,4'-bis(2,3-dicarboxyphenoxy)diphenyl sulfone dianhydride;

4-(2,3-dicarboxyphenoxy)-4'-3,4-dicarboxyphenoxy)-diphenyl-2,2propane dianhydride;

4-(2,3-dicarboxyphenoxy)-4'-(3,4-dicarboxyphenoxy)-diphenyl ether dianhydride;

4-(2,3-dicarboxyphenoxy)-4'-(3,4-dicarboxyphenoxy)-diphenyl sulfide dianhydride;

4-(2,3-dicarboxyphenoxy)-4'-(3,4-dicarboxyphenoxy)-benzophenone dianhydride;

4-(2,3-dicarboxyphenoxy)-4'-(3,4-dicarboxyphenoxy)-diphenyl sulfone dianhydride, and various mixtures thereof.

A preferred class of aromatic bis(ether anhydride)s included by formula (XVIII) above includes compounds wherein T is of the formula (XX):

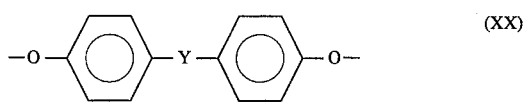

(XX)

and the ether linkages are in the 3,3', 3,4', 4,3', or the 4,4' positions, and mixtures thereof, and where Y is selected from the group consisting of: formulae (XXI):

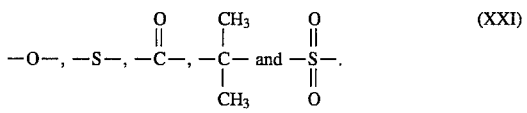

(XXI)

When PEI/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

The organic diamines of formula (XIX) include, for example:

m-phenylenediamine;
p-phenylenediamine;
4,4'-diaminodiphenylpropane,
4,4'-diaminodiphenylmethane (commonly named 4,4'-methylenedianiline);
4,4'-diaminodiphenyl sulfide;
4,4'-diaminodiphenyl sulfone;
4,4'-diaminodiphenyl ether (commonly named 4,4'-oxydianiline);
1,5-diaminonaphthalene;
3,3-dimethylbenzidine;
3,3-dimethoxybenzidine;
2,4-bis(beta-amino-t-butyl)toluene;
bis(p-beta-amino-t-butylphenyl)ether;
bis(p-beta-methyl-o-aminophenyl)benzene;
1,3-diamino-4-isopropylbenzene;
1,2-bis(3-aminopropoxy)ethane;
benzidine;
m-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1-4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine; and
mixtures of such diamines.

Generally, useful PEI have an intrinsic viscosity [η] to greater than about 0.2 deciliters per gram, preferably of from about 0.35 to about 0.7 deciliters per gram measured in m-cresol at 25° C.

Included among the many methods of making the PEI are those disclosed in U.S. Pat. Nos. 3,847,867, 3,814,869, 3,850,885, 3,852,242 and 3,855,178. These disclosures are incorporated herein in their entirety by reference for the purpose of teaching, by way of illustration, general and specific melthods for preparing PEI for use in the blends of this invention.

Illustrative of a particularly preferred PEI falling within the scope of Formula (XI) is one comprising repeating units wherein $R^2$ is paraphenylene and $R^1$ is the divalent moiety of formula (XXII):

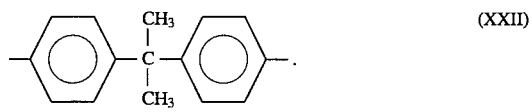

(XXII)

The PEI is generally present in an amount up to about 50% by weight of the composition, preferably between about 5–30% by weight of the composition and especially preferred between about 10–25% by weight of the composition.

Additional embodiments of the invention include thermoplastic molding compositions containing poly(aryl ether) resins in place of the polyetherimide resins. The poly(aryl ether) resins which may be used as ingredient (c) are thermoplastic polyarylene-polyether-polysulfones wherein the arylene units are interspersed with ether and sulfone linkages. These resins may be obtained by reaction of an alkali metal double salt of a dihydric phenol and a dihalobenzenoid compound, either or both of which contain a sulfone or ketone linkage, i.e., —SO$_2$— or —CO— between arylene groupings, to provide sulfone or ketone units in the polymer chain in addition to arylene units and ether units. The polysulfone polymer has a basic structure comprising recurring units of the formula (XXIII):

—O—E—O—E'— (XXIII)

wherein E is a residuum of the dihydric phenol and E' is a residuum of the benzenoid compound having an inert electron withdrawing group in at least one of the positions ortho and para to the valence bonds: both of said residua are valiantly bonded to the ether oxygens through aromatic carbon atoms. Such polysulfones are included within the class of polyarylene polyether resins described, for example, in U.S. Pat. Nos. 3,264,536 and 4,108,837, which are included herein by reference.

The residuum of a dihydric phenol, E, is derived from dinuclear phenols of the formula (XXIV):

HO—(Ar—R—Ar)—OH     (XXIV)

wherein Ar is an aromatic group and preferable is a phenylene group, each A may independently be the same or different inert substituent groups, such as alkyl groups having from 1 to 4 carbon atoms, halogen atoms (i.e., fluorine, chlorine, bromine or iodine) or alkoxy radicals having from 1 to 4 carbon atoms, each r is independently an integer having a value of from 0 to 4, inclusive and R is representative of a bond between aromatic carbon atoms as in dihydroxy diphenyl, or is a divalent radical, including, for example, C(O), O, S, S—S, SO$_2$ or a divalent organic hydrocarbon radical, such as alkylene, alkylidene, cycloalkylene, cycloalkylidene, or the halogen alkyl, aryl substituted alkylene, alkylidene, cycloalkylene, and cycloalkylidene radicals as well as alkarylene and aromatic radical and a ring fused to both Ar groups Typical preferred poly(aryl ether) resins comprise recurring units having the following formula (XXV):

wherein A and r are as previously defined and $R_1$ and $R_2$ are representative of a bond between aromatic carbon atoms. Even more preferred are the polysulfones of the above formula comprising repeat units wherein each r is zero, $R_1$ is a divalent connection radical of the formula (XXVI):

wherein $R_3$ is independently selected from lower alkyl, aryl, and the halogen substituted groups thereof, preferable methyl and $R_2$ is a sulfone group.

The poly(aryl ether) polymer has a weight average (Mw) molecular weight in excess of about 5000.

An especially preferred poly(aryl ether) resin comprises repeating units of the formula (VI):

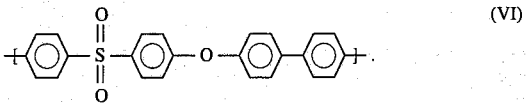

The blend compositions of the present invention may be modified by the addition of other additives conventionally used in the art of plastics compounding. Such additives can include fillers (such as, for example, clay, mica or talc), supplementary delustrants, reinforcing agents (such as, for example, glass fibers), impact modifiers (such as, for example, epoxy modified polyolefins), plasticizers, flow promoters and other processing aids, stabilizers, colorants, pigments, mold release agents, ultraviolet screening agents, drip inhibitors (such as, for example, polytetrafluoroethylene (PTFE)), supplementary or synergistic flame retardant, and the like.

The preparation of the compositions of the present invention is normally achieved by merely blending the ingredients under conditions for the formation of an intimate blend. Such conditions often include mixing in single or twin screw type extruders or similar mixing devices which can apply a shear to the components. It is often advantageous to apply a vacuum to the melt through at least one vent port in the extruder to remove volatile impurities in the composition.

Intrinsic Viscosity (I.V.)

The intrinsic viscosity was measured at a temperature of 25° C. in methylene chloride and is reported in deciliters/gram (dl/g).

Molecular Weight (Mw)

The weight average molecular weight (Mw) is determined by gel permeation chromatography (GPC) in methylene chloride relative to polycarbonate standards using a UV detector at 254 nm.

Autoclave Conditions

Test specimens were subjected to autoclave conditioning to simulate medical sterilization conditions. An American Sterilizer Autoclave (AMSCO) Series 2023 Vac-A-Matic was used for the rapid autoclave cycle testing. A single autoclave cycle consists of the following steps:

1. A pre-vacuum step to heat and condition the parts. The prevacuum step consists of alternating pulses of steam followed by evacuation, each pulse lasting for approximately 15 seconds. The pulse cycle is repeated approximately 5 times to condition the parts.

2. A sterilization step consisting of 5 minutes of steam at about 270° F. The 270° F. is an important temperature distinction for this cycle as it is higher than that for a traditional gravity displacement cycle of about 250° F.

3. The third step is a drying step which consists of evacuating the chamber for approximately 4 minutes utilizing a vacuum drawdown of approximately 30 in. of Hg. After the vacuum drying, there is a 1 minute delay followed by returning to Step 1.

After subjecting the test specimens to 500 autoclave cycles consisting of steps 1–3, a visual observance of the test specimens for cracks and blisters was performed followed by testing the notched Izod impact resistance of the specimens according to ASTM D-256. Samples failing the test typically form blisters and/or cracks which negatively affects the notched Izod impact performance. Test specimens having a notched Izod impact value of less than about 1.7 ft-lbs/in are too brittle to be acceptable and these compositions are defined as failing the autoclave test.

It should also be clear that autoclave resistant articles prepared from the compositions of the present invention represent an additional embodiment of this invention.

The following examples are provided to illustrate some embodiments of the present invention. They are not intended to limit the invention in any aspect. All percentages are by weight based on the total weight of the entire composition, unless otherwise indicated.

Preparation 1

This preparation is of a poly(ester-carbonate) (PEC) resin. To a 38 liter reactor vessel there are added 8 liters of methylene chloride, 6 liters of water, 1,906 grams (8.36 moles) of bisphenol A, 20 milliliters of triethylamine, 4 grams of sodium gluconate, and 65 grams of p-tertiary butylphenol molecular weight regulator. At apH of between about 9–10.5, 2544 grams (12.54 moles) of a mixture of 50% by weight of isophthaloyl dichloride and 50% by weight of terephthaloyl dichloride in 4 liters of methylene chloride are added over about a 20 minute interval while controlling the pH at about 9–10.5 with 35 weight percent aqueous caustic. After the addition of the diacid chloride mixture, phosgene is added at a rate of about 36 grams per minutes for about 20 minutes while controlling the pH at about 10–11 with 35 weight percent aqueous caustic. The polymer mixture is diluted with about 5 liters of methylene chloride and the brine phase is separated by centrifuge. The resulting polymer phase is washed with aqueous acid and water and is then recovered by high pressure steam precipitation to yield a white powder having an Intrinsic Viscosity of 0.5 dl/g in methylene chloride at 25° C. Optionally, to this resin powder is added a minor amount (about 0.1 parts by weight per hundred parts by weight of resin) of a stabilizer mixture containing a phosphite color stabilizer and an epoxy stabilizer. This resin product is then fed to an extruder operating at temperature of about 316° C. to extrude the resin into strands and the extruded strands are chopped into pellets.

Preparation 2.

This preparation is of "PEI-1", a polyetherimide utilizing m-phenylene diamine. A mixture of bisphenol A dianhydride (BPA-DA) and m-phenylene diamine (mPD) in o-dichlorobenzene was prepared by first dissolving 5.0225 g (9.650 millimoles) of BPA-DA and 1.0814 g (10.00 millimoles) mPD in about 50 mL of o-dichlorobenzene at about 150° C. for approximately 1 hour, and thereafter adding 0.1037 g (0.70 millimoles) phthalic anhydride (PA). The solution was slowly warmed to about 180° C. and refluxed under nitrogen for 3 hours at this temperature to produce a prepolymer. A 0.10 g sample was then removed to a small test tube and heated at about 350° C. for about 15 minutes under nitrogen to substantially finish the conversion to PEI. The resulting polymer was dissolved in dichloromethane and its molecular weight was determined, by gel permeation chromatography (GPC) against a polystyrene standard, to be 24,700 $M_N$ (typical of the desired polyetherimides).

Preparation 3.

This preparation is of "PEI-2", a polyetherimide utilizing p-phenylene diamine. The procedure as outlined in Preparation 2 was followed with the substitution of p-phenylene diamine (pPD) for the m-phenylene diamine (m PD). The desired polyetherimide was obtained.

Preparation 4.

This is a typical preparation of a poly(ether sulfone) polymer. In a 250 mL. flask equipped with a stirrer, thermometer, a water cooled condenser and a Dean Stark moisture trap filled with benzene, is placed 11.42 grams of the 2,2-bis(4-hydroxyphenyl)propane (0.05 moles), 13.1 grams of a 42.8 weight percent potassium hydroxide solution (0.1 moles KOH), 50 mL of dimethylsulfoxide and 6 mL. benzene. The system is purged with nitrogen to maintain an inert atmosphere over the reaction mixture and the mixture is refluxed for about 3 to about 4 hours, continuously removing water contained in the reaction mixture as a azeotrope with benzene. Enough water is removed to give a reflux temperature of between about 130°–135° C. The mixture is allowed to cool and 14.35 grams (0.05 mole) of 4,4'-dichlorodiphenylsulfone is added followed by 40 mL of anhydrous dimethylsulfoxide, under nitrogen pressure. The mixture is heated to about 130° C. and maintained held at about 130°–140° C. with good stirring for about 4–5 hours. The viscous, orange solution is poured into 300 mL. water while rapidly circulating in a high speed blender, and the finely divided white polymer is filtered and is dried in a vacuum oven at about 110° C. for about 16 hours. The reduced viscosity as measured in chloroform (0.2 gram polymer in 100 mL. at 25° C.) is 0.59.

The polymer comprised repeating units of formula (XXVI):

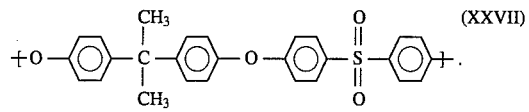

(XXVII)

PES-1.

PES-1 is a polyether sulfone polymer generally made as described in Preparation 4 and having predominately repeating units of formula (XXVIII):

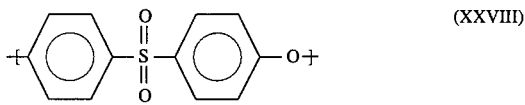

(XXVIII)

commercially available from Amoco as Radel® A300.

PES-2.

PES-2 is a polyether sulfone polymer generally made as described in Preparation 4 and having predominately repeating units of formula (VI):

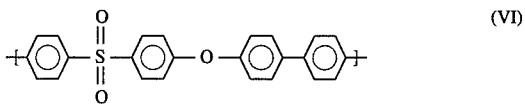

(VI)

commercially available from Amoco as Radel® R5000A.

EXAMPLES

In a series of runs, PEC prepared according to Preparation 1 was blended with 0.1 percent by weight of the blend of an antioxidant (Irgafos® 168; Ciba-Geigy Corp.), 2.0 percent by weight of titanium dioxide (TiO$_2$), and various proportions of a PEI as prepared according to Preparations 2 (PEI-1) and 3 (PEI-2). The blends were fed to an extruder at a temperature of about 340° C. to intimately mix the components and extruded into strands. The strands were chopped into pellets and injection molded under standard conditions into test samples for physical property testing. The composition of each blend and the notched Izod test results after completion of the previously described autoclave test are set forth in the Tables below.

TABLE 1

| sample | PEC | PEI | TiO$_2$ | NI |
|---|---|---|---|---|
| 1 | 98 | 0 | 2 | dissolves |
| 2 | 75 | 25 (PEI-1) | 2 | 1.6 |
| 3 | 75 | 25 (PEI-2) | 2 | 2.4 |
| 4 | 75 (PC*) | 25 (PEI-2) | 2 | 1.3 |

NI is notched Izod measured after 500 autoclave cycles; PC* is a polycarbonate, the phosgenation product of bisphenol-A (Lexan ® 131; General Electric Co., Mount Vernon, Indiana).

The data in Table 1 clearly illustrate the improved autoclave resistance of the compositions of the present invention. Sample 2, utilizing a PEI in which the diamine is m-phenylene diamine (PEI-1), fails the autoclave test. A comparative sample, Sample 3, utilizing a PEI in which the diamine is p-phenylene diamine (PEI-2) surprisingly passes the autoclave test. Comparative sample 4 utilizes the PEI-2 but contains a polycarbonate homopolymer of bis-phenol A and phosgene in place of the polyester carbonate. Comparison of this sample to sample 3 illustrates the utility of PEC resin in the compositions of the present invention.

The samples in Table 2 were prepared as generally described for the samples in Table 1.

TABLE 2

| sample | PEC | PEI-2 | TiO$_2$ | NI |
|---|---|---|---|---|
| 5 | 75 | 25 | 2 | 2.4 |
| 6 | 85 | 15 | 2 | 2.5 |
| 7 | 90 | 10 | 2 | 1.8 |
| 8 | 95 | 5 | 2 | 0.4 |
| 9 | 98 | 2 | 2 | 0.4 |
| 10 | 99 | 1 | 2 | 0.6 |

NI is notched Izod measured after 500 autoclave cycles.

The data in Table 2 illustrates the surprising effectiveness of the PEI-2 in the poly(ester-carbonate) (PEC) resins even at very low levels. At levels as low as 10 parts, significant improvement in autoclave resistance is realized.

The samples in Table 3 were prepared as generally described for the samples in Table 1.

TABLE 3

| sample | PEC | PEI-2 | TiO$_2$ | NI |
|---|---|---|---|---|
| 11 | 84.5 | 15 | 0.5 | 2.9 |
| 12 | 84 | 15 | 1.0 | 2.3 |
| 13 | 83.5 | 15 | 1.5 | 2.2 |
| 14 | 80 | 15 | 5 | 0.3 |

NI is notched Izod measured after 500 autoclave cycles.

The data in Table 3 illustrate that a fairly wide range of TiO$_2$ can be utilized in the compositions of the present invention while retaining acceptable impact strength. It is contemplated that other pigments, colorants and additives could also be utilized with similar positive results.

The samples in Table 4 comprise PEC and the poly(ether sulfone)s as previously described. The samples were prepared as generally described for the samples in Table 1.

TABLE 4

| sample | PEC | PES-1 | PES-2 | TiO$_2$ | NI |
|---|---|---|---|---|---|
| 15 | 75 | 25 | 0 | 2 | 0.3 |
| 16 | 75 | 0 | 25 | 2 | 6.5 |

NI is notched Izod measured after 500 autoclave cycles.

The data in Table 4 illustrates the effectiveness of PES-2 at improving the autoclave resistance of the poly(ester-carbonate) (PEC) resins as compared to PES-1.

We claim:

1. A resin composition comprising:

(a) a poly(ester-carbonate) resin, and (b) an effective amount of a polyetherimide resin to provide autoclave resistance to at least 500 cycles at 270° F. and wherein a test specimen of the resin composition has a notched Izod impact strength of at least about 1.7 ft-lbs/in after the 500 cycles, wherein the polyetherimide comprises repeating chain units of the formula:

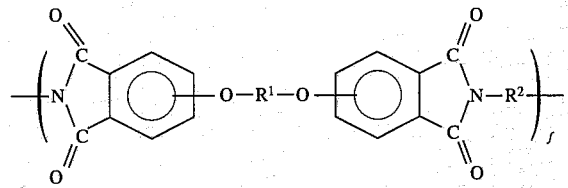

wherein f is an integer of from about 10 to about 500; $R^2$ is para-phenylene and $R^1$ is

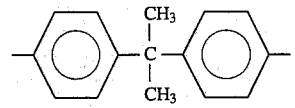

2. The composition of claim 1 wherein the notched Izod impact resistance of a test specimen made from the composition is at least about 2 ft-lb/in after 500 autoclave cycles at 270° F.

3. The composition of claim 1 further comprising a polycarbonate resin.

4. The composition of claim 1 further comprising at least one member of the group consisting of fillers, supplementary delustrants, reinforcing agents, impact modifiers, plasticizers, flow promoters, processing aids, stabilizers, colorants, pigments, mold release agents, ultraviolet screening agents, drip inhibitors and flame retardants.

5. An article of manufacture made from the composition of claim 1.

6. A method to provide an autoclave resistant composition comprising the step of admixing a poly(ester-carbonate) resin, and an effective amount of a polyetherimide to provide autoclave resistance to at least 500 cycles at 270° F. and wherein a test specimen of the autoclave resistant composition has a notched Izod impact strength of at least about 1.7 ft-lbs/in after the 500 cycles, wherein the polyetherimide comprises repeating chain units of the formula:

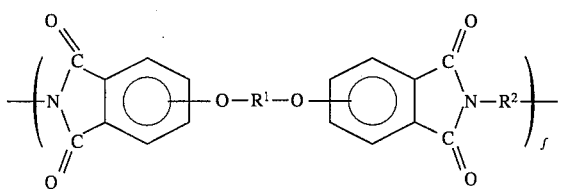

wherein f is an integer of from about 10 to about 500; $R^2$ is para-phenylene and $R^1$ is

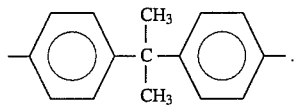

7. An article of manufacture made from the composition of the method of claim 6.

8. A resin composition consisting essentially of:
(a) a poly(ester-carbonate) resin, and
(b) an effective amount of a polyetherimide resin to provide autoclave resistance to at least 500 cycles at 270° F. and wherein a test specimen of the resin composition has a notched Izod impact strength of at least about 1.7 ft-lbs/in after the 500 cycles, wherein the polyetherimide comprises repeating chain units of the formula:

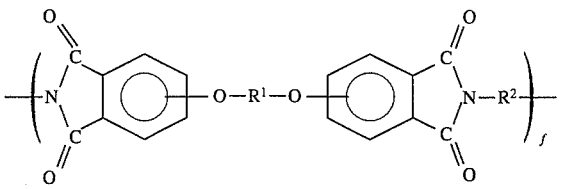

wherein f is an integer of from about 10 to about 500; $R^2$ is para-phenylene and $R^1$ is

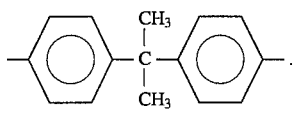

* * * * *